(12) United States Patent
Granberg

(10) Patent No.: US 6,343,433 B1
(45) Date of Patent: Feb. 5, 2002

(54) METHOD AND APPARATUS FOR SEPARATING TARGET AND NON-TARGET SPECIES HARVESTED FROM WATERBODIES

(76) Inventor: Lee Granberg, R.R. #2, Site 11, Comp. 5, Baxter Road, Enderby, British Columbia (CA), V0E 1V0

( * ) Notice: Subject to any disclaimer, the term of this patent is extended or adjusted under 35 U.S.C. 154(b) by 0 days.

(21) Appl. No.: 09/583,273

(22) Filed: May 31, 2000

Related U.S. Application Data
(60) Provisional application No. 60/152,798, filed on Sep. 8, 1999.

(51) Int. Cl.[7] .......................... A01K 79/00; A01K 73/02
(52) U.S. Cl. ............................... 43/6.5; 114/255; 43/9.2
(58) Field of Search ......................... 43/6.5, 9.1, 9.2; 114/255; 37/315

(56) References Cited

U.S. PATENT DOCUMENTS

| | | | |
|---|---|---|---|
| 1,745,251 A | 1/1930 | Enright | 43/6.5 |
| 3,184,080 A | 5/1965 | Luketa | 43/6.5 |
| 3,273,276 A | 9/1966 | Englesson | 43/6.5 |
| 3,596,394 A | 8/1971 | Reeder | 43/6.5 |
| 3,768,193 A | 10/1973 | London | 43/6.5 |
| 3,783,535 A | 1/1974 | Hanks | 43/6.5 |
| 4,074,651 A | 2/1978 | Arduser | 114/255 |
| 4,086,717 A | 5/1978 | Aucoin, Jr. et al. | 43/6.5 |
| 4,117,726 A | 10/1978 | McGroddy | 43/6.5 |
| 4,294,542 A | 10/1981 | Strauss | 356/339 |
| 4,402,154 A | * 9/1983 | Pence | 43/9.2 |
| 4,458,621 A | 7/1984 | De Clifford | 114/255 |
| 4,509,286 A | 4/1985 | John | 43/9.1 |
| 4,551,042 A | 11/1985 | Hagedorn et al. | 406/93 |
| 4,768,920 A | 9/1988 | Gurth | 415/90 |
| 4,805,335 A | * 2/1989 | West et al. | 43/9.2 |
| 5,018,946 A | 5/1991 | Breckner | 417/197 |
| 5,123,195 A | * 6/1992 | Hawkins | 43/9.2 |
| 5,215,197 A | 6/1993 | Harvey | 209/680 |
| 5,361,528 A | 11/1994 | Peacock | 43/6.5 |
| 5,575,102 A | * 11/1996 | Coulon | 43/9.2 |
| 5,839,216 A | 11/1998 | Baker et al. | 43/6.5 |
| 6,112,699 A | 9/2000 | Saxby et al. | 43/9.1 |

FOREIGN PATENT DOCUMENTS

| | | | | |
|---|---|---|---|---|
| FR | 997247 B1 | 9/1951 | | 43/6.5 |
| GB | 976520 B1 | 11/1964 | | 43/6.5 |

* cited by examiner

Primary Examiner—Darren W. Ark
(74) Attorney, Agent, or Firm—Antony C. Edwards

(57) ABSTRACT

The apparatus for separating target and non-target species harvested from a waterbody includes a catch boat towable behind a trawler for towing concomitantly with a trawl net towed behind the trawler. An elongate intake conduit having first and second ends extends between the catch boat and the rearmost, that is, downstream end of the trawl net. The first end of the intake conduit is mountable to, so as to be in fluid communication with, an aperture in the trawl net, when the trawl net is submerged in the waterbody. The second end of the intake conduit is opposite the first end of the intake conduit and is mounted to the catch boat in fluid communication with a first fluid reservoir in the catch boat. Fluid containing harvest species and by-catch is urged along the intake conduit from the first end to the second end of the intake conduit so as to discharge fluid from the second end of the intake conduit into the first fluid reservoir. Fluid and by-catch are discharged from the catch boat.

11 Claims, 8 Drawing Sheets

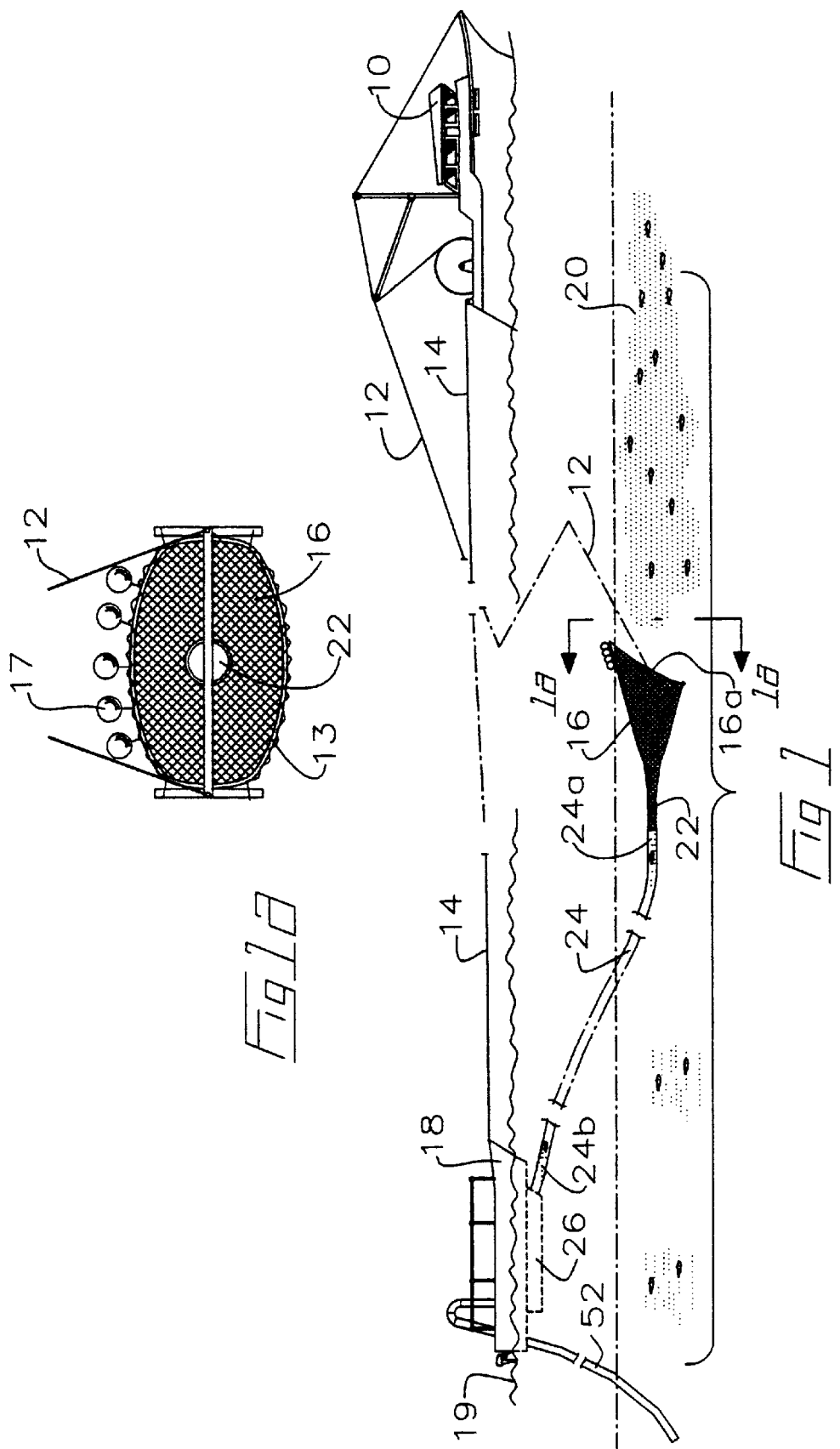

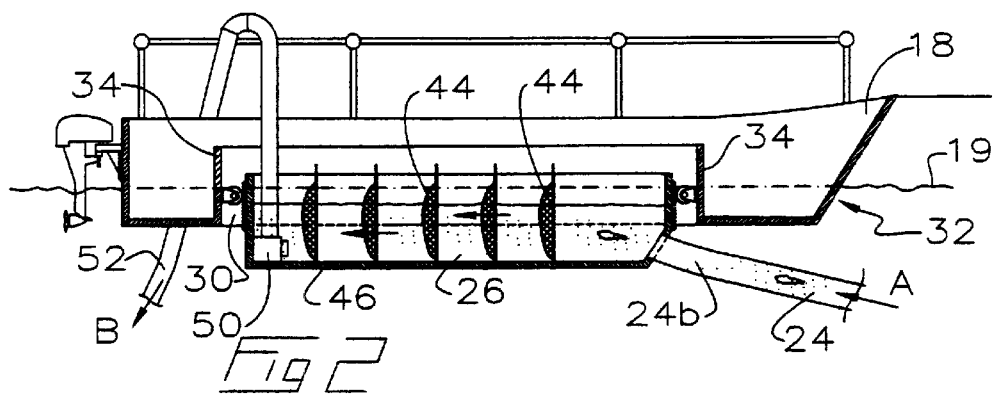
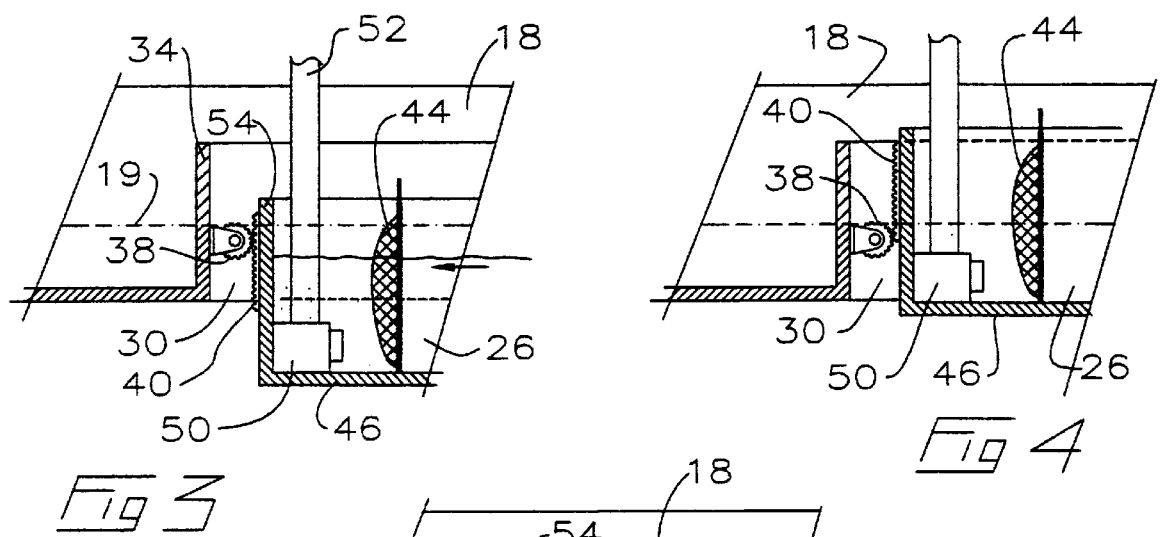
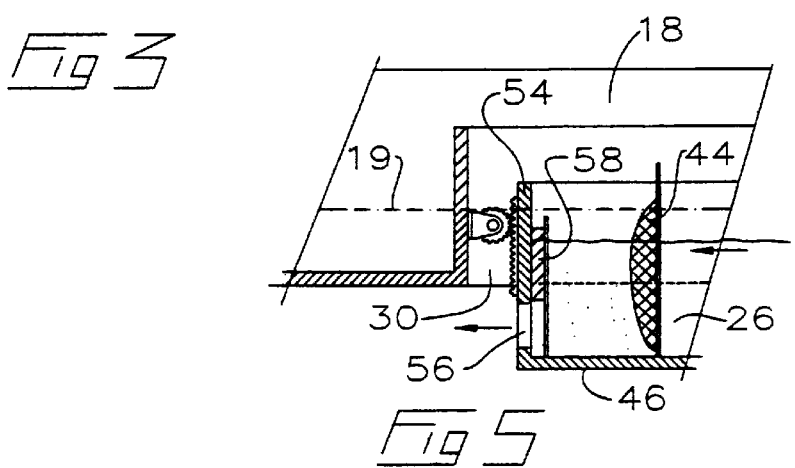

METHOD AND APPARATUS FOR SEPARATING TARGET AND NON-TARGET SPECIES HARVESTED FROM WATERBODIES

CROSS REFERENCE TO RELATED APPLICATION

This application claims priority from United States Provisional patent application Ser. No. 60/152,798 filed Sept. 8, 1999 titled A Device For Separating Target And Non-Target Species Harvested From Waterbodies.

FIELD OF THE INVENTION

This invention relates to an apparatus for live harvesting of an aquatic target species at depth and bringing it to a collection point at the surface of a waterbody in a manner which substantially reduces the mortality rate. In addition, this apparatus permits ready separation, either or both at the surface collection point, or during transportation to the surface collection point, of live target and any non-target species harvested simultaneously from the waterbody and facilitates the reintroduction of the non-target species at depth to the waterbody.

BACKGROUND OF THE INVENTION

Conventional practice for the mass harvesting of relatively small aquatic target species such as shrimp is usually accomplished by using trawl nets, or the like, which are towed behind a trawler. These nets catch both the target and non-targeted or by-catch species indiscriminately. As the volume of bio-mass is compressed into the collection end, or cod end, of the trawl net as it is moved through the water body, a high mortality of both target and by-catch species results. In addition, this compression and the subsequent lifting movement of the filled net from depth to the surface of the water body and its transportation onboard the trawl boat results in additional mortality and inflicts damage to the target species resulting in a decrease in quality.

Public pressure and regulation now require that more attention to be paid to limiting the mortality rate of the by-catch, since much of it is made up of juveniles of commercially valuable species. The mortality of such juvenile by-catch species is the result of compaction and suffocation in the cod-end of the trawl net during netting, and as the net is hauled onboard the trawler and the inability to survive the temperature differential of the water from the point of catch to the point of release at the surface of the water body.

Without intending to be limiting, it is an object of this invention to transport both target and by-catch species live to a container at the surface of a water body along with a constant volume of water from the depth at which the species were caught.

Again without intending to be limiting, it is a further object of this invention to provide a means of escapement for by-catch species during the transportation of by-catch and target species to the surface.

Again without intending to be limiting, it is a further object of this invention to provide a means of separating target and by-catch within the surface container and returning the by-catch directly to depth to thereby reduce mortality.

Further, this invention overcomes inherent difficulties where the target species and by-catch species are quite similar in size and where the by-catch species is an endangered species.

Applicant is aware that many bodies of fresh water have in the past seen the introduction of nonindigenous aquatic organisms intended as an additional forage source for indigenous sport fish. In some cases the introduced species has resulted in dramatically adverse changes to the aquatic ecosystem and has become a direct competitor for available food resources, placing the indigenous species in even greater peril. Such has been the experience with the introduction of *Mysis relicta,* a.k.a. Opossum shrimp or Mysis shrimp as a food source for *Oncorhynchus nerka kennerlyi* a.k.a. Kokanee, land-locked sockeye or silver trout. Control of the Mysis shrimp population through an aggressive harvesting program is therefore seen as a major component of a plan to protect what has become, in some lakes, an endangered species, namely the Kokanee.

In the prior art Applicant is aware of U.S. Pat. No. 3,768,193, which issued Oct. 30, 1973 to London for a Brine Shrimp Harvesting Apparatus. London discloses a method of using a elongated housing containing a rotatable internal screw, mounted on a raft, for removing shrimp concentrated on a net at the surface of a water body. Applicant is further aware of U.S. Pat. No. 5,361,528 which issued Nov. 8, 1994 to Peacock for a Trawling System and Trawl Device for Shrimp. Peacock discloses a device having angularly adjustable opposed elongated arms for trawling over the seabed. Water pressure as the trawl is moved over the seabed forces shrimp to the outer extremities of the elongated arms where they can be drawn to the trawl boat by onboard pumps.

What is neither taught nor rendered obvious from the prior art, and which is an object of the present invention to provide is an apparatus which permits ready separation, at the surface collection point, of live target and any non-target species harvested simultaneously from a body of fresh water and which facilitates the reintroduction of the non-target species to the waterbody at a depth where the water temperature is generally the same as where they were harvested thereby reducing mortality of the non-target species.

SUMMARY OF THE INVENTION

The present invention relates to a device for harvesting a target species, which in this example is, but not limited to, a variety of fresh water shrimp, separating from the target species any non-target species, such as juveniles of a commercially valuable sport fishery species such as Kokanee salmon which have been inadvertently and simultaneously harvested and releasing the non-target species back to the same depth and water temperature at which they were caught.

The device of the present invention includes a trawl net and a catch boat each being towable by a trawler by separate towing lines or cables so as to be movable concomitantly through the water by the trawler. A catch drawer is mounted within the catch boat for selective vertical movement relative thereto by a means for selective vertical movement of the catch drawer in relation to the catch boat. A conduit connects the cod-end of the trawl net to a forward end of the catch drawer. The conduit permits both target and by-catch species to be freely carried through the conduit along with a constant volume of water, which is funneled through the conduit as the trawl net is pulled through the water.

A pump or other means maintains the surface level of water in the catch drawer below the surface level of the lake or other large body of water in which the device of the present invention is situate.

A series of removable nets or screens are positioned within the catch drawer for separating target and by-catch species. A means is provided to convey by-catch organisms from the catch drawer to a layer of cooler water below the surface of a waterbody generally at the trawl net operating depth.

In an alternative embodiment, a by-catch separating device is positioned downstream of the trawl net to provide means whereby escapement of by-catch species is naturally encouraged. The by-catch separating device is a short tubular section having an internal baffle or screen comprising a plurality of parallel, spaced apart members secured therein and biased against the incoming water flow. The internal baffle creates a downstream chamber wherein by-catch organisms unable to pass through the spaced apart members are directed toward one side of the separator which contains an escape aperture. A source of illumination is fixed externally of the separator in proximity to the escape aperture as an attractant to encourage by-catch to egress the downstream chamber through the escape aperture.

The members comprising the internal baffle or screen may be flexible, such as of nylon strings, and are generally parallel and spaced apart sufficiently so as to permit passage therethrough of all the target species. Where the lower size range of non-target species approximates target species size, a further separation is possible by placing a further by-catch separating device in series upstream of the primary. The internal baffle of the secondary separator, in order to separate out smaller by-catch, has the spaced apart members positioned closer together. Such separation will still permit a reduced quantity of smaller sized non-target organisms to be brought to the catch boat along with the intended target species.

Alternatively, a by-catch separating device may comprise a plurality of spaced apart internal baffle members wherein the nylon strings of successive downstream baffle members are positioned so as to permit passage of successively smaller sized non-target species.

Put another way, the device of the present invention for separating target and non-target species harvested from waterbodies includes in a broad sense a trawl net attached to a trawler by a line or cable or the like so as to be movable through the water when towed by the trawler, and a catch boat also attached to the trawl boat by another line or cable or the like so as to be movable concomitantly with the trawl net when towed by the trawler. However the trawl net and trawler per se do not form part of the invention as they are conventional with the exception that a hole is made in the cod end of the trawl net. In one embodiment, a catch drawer is mounted within the catch boat for selective vertical movement relative thereto by means for selective vertical movement of catch drawer. A conduit connects the leading end of the catch drawer to the cod-end of the trawl net so as to permit fluid communication in a flow of water from the cod-end through the conduit into the catch drawer of water from an operating depth containing both target and by-catch species.

A series of removable filters or screens are positioned in a spaced array within the catch drawer, spaced in a water flow direction from the front of the drawer to the back of the drawer. The screens or filters may have apertures cascading in a series of stepped sizes from, for example, larger apertures at the front filters to smaller apertures at the aft or rear filters. The screens or filters may be perpendicular to the flow direction, i.e., perpendicular to the longitudinal axis of the hull of the catch boat.

Where such by-catch has been reduced through introduction of a separating device, the catch boat may be a compartmentalized craft having a receiving compartment, a by-catch holding compartment and a discharge compartment. The receiving compartment contains by-catch diverting screens, a target species harvesting device and a pump. The pump is screened within the receiving compartment to prevent inadvertent loss of harvestable target species. The receiving compartment and discharge compartment are in fluid communication with each other through the holding compartment by way of manually controlled flow gates. The discharge compartment is in direct fluid communication with the water body to permit the reintroduction of entrapped by-catch to the water body.

Target species may be collected by suitable collection apparatus positioned within the catch boat or transferred directly to a nearby vessel, for storage or processing, through a suitable pump and conduit.

A pump may be provided within the catch drawer for pumping discharged fluid and by-catch along a second conduit leading from the pump to the operating depth to convey by-catch to the cooler water below the thermocline. Additionally, a selectively operable door in the aft end of the catch drawer may be provided to allow vacuum drawn discharge of by-catch to the water surface when seasonal thermoclines in the water are not prevalent.

In summary, the apparatus for separating target and non-target species harvested from a waterbody includes a catch boat towable behind a trawler for towing concomitantly with a trawl net towed behind the trawler. An elongate intake conduit having first and second ends extends between the catch boat and the rearmost (i.e. downstream end of the trawl net. The first end of the intake conduit is mountable to, so as to be in fluid communication with, an aperture in the trawl net, when the trawl net is submerged to at least a thermocline depth in the waterbody. The second end of the intake conduit is opposite the first end of the intake conduit and is mounted to the catch boat in fluid communication with a first fluid reservoir in the catch boat.

Fluid urging means are provided for urging fluid containing harvest species and by-catch along the intake conduit from the first end to the second end of the intake conduit so as to discharge fluid from the second end of the intake conduit into the first fluid reservoir. Outflow means are provided for discharging fluid and by-catch from the catch boat.

In one embodiment, the second end of the intake conduit is mounted in fluid communication with a first aperture in catch boat. The first aperture in the catch boat may be in a leading end of the catch boat, and may be below a waterline of the catch boat when floating in the waterbody.

The fluid urging means may also be a selectively vertically displaceable catch drawer mounted within a well in the catch boat. In this embodiment, the second end of the intake conduit is mounted to an intake aperture in the catch drawer, positioned so as to be submergible below a waterline of the catch boat when the catch boat is floating in the waterbody. The catch drawer is lowered relative to the well. The first fluid reservoir is contained within the catch drawer.

In the latter embodiment, at least one filter is mounted in the catch drawer and the outflow means is mounted within the catch drawer oppositely disposed from the intake aperture relative to the filter or filters. The filters may be an array of filters spaced apart between the intake aperture and the outflow means. Advantageously, the array of filters have screening sizes which decrease from a first end of the array adjacent the intake aperture progressively to an opposite second end of the array.

The outflow means may include a fluid pump communicating with an elongate outflow conduit which may be extended to a thermocline depth in the waterbody. The outflow means may further include a selectively operable gate in an aft end of the catch drawer.

The fluid urging means may be at least one water level regulating pump mounted to the catch boat in fluid communication with the first fluid reservoir. Fluid is pumped from the first fluid reservoir into the waterbody to thereby maintain a water level of the first fluid reservoir below a waterline of the catch boat when floating in the waterbody.

In the former embodiment, at least one by-catch screen directs by-catch to a second fluid reservoir in the catch boat. The outflow means may include an outflow conduit mounted in fluid communication with an outflow aperture in the catch boat and the second fluid reservoir. Advantageously, harvesting means such as an endless conveyor are mounted to the catch boat for harvesting harvest species from the first fluid reservoir.

In one preferred embodiment, not intended to be limiting, the intake conduit includes a screening tube for screening out by-catch. The screening tube has an aperture in a wall of the tube. A screen is mounted in the screening tube and positioned across a conduit passageway of the screening tube, adjacent the aperture in the wall. The screen urges by-catch out of the screening tube through the aperture in the wall. Advantageously a light source is positioned outside of the aperture to assist by luring the by-catch towards the light.

The screen may be a parallel array of uniformly spaced apart elongate flexible members. The array of flexible members may be mounted in the screening tube by journalling opposite ends of each member of the array of flexible members through corresponding holes in opposite walls of the screening tube. Each member of the array of flexible members may be tensioned by a resilient tensioner acting on some or all of the members whether singly or grouped.

In one aspect of this part of the invention, the screen is mounted in the screening tube at an acute angle relative to the wall to thereby form a wedge-shaped upstream cavity in the screening tube between the screen and the wall. The aperture in the wall is adjacent a vertex of the wedge-shaped cavity.

The fluid urging means may, in a further embodiment, be a second conduit placed coaxially within the intake conduit. The second conduit is at its second end connected to a pump which urges fluid under pressure toward a sealed first end of the second conduit which is positioned near the downstream end of the trawl net. Nozzles located along the second conduit direct pressurised fluid in a direction consistent with a flow toward the catch boat resulting in a lower pressure in the vicinity of the intake conduit.

The fluid urging means may, in a further embodiment, be a solid, annular flared collar secured to the first end of the intake conduit in proximity to the downstream end of the trawl net. As the apparatus is drawn through the water body the flared collar funnels liquid through the intake conduit toward the catch boat to thereby assist in the transportation of target organisms through the intake conduit toward the catch boat.

The fluid urging means may, in a further embodiment, be a hydraulic screw positioned within the intake conduit, in proximity to the catch boat, and rotatable by means well known in the art mounted on the catch boat.

The fluid urging means may, in a further embodiment, be a water wheel positioned within the catch drawer in proximity to the outflow aperture. Rotation of the water wheel by a motor and pulley arrangement located on the catch boat, or by other means well known in the art, acts to enhance liquid flow through the catch drawer from the intake conduit to the outflow aperture and into the waterbody. As the water wheel rotates at relatively low revolutions per minute it is ideal for assisting with the clearing of zooplankton and the like which may also be inadvertently brought to the surface.

Thus the method of the present invention includes the steps of:

(a) mounting an elongate intake conduit between the trawl net and the catch boat so that the first end of the intake conduit is mounted to, so as to be in fluid communication with, the aperture in the trawl net when the trawl net is submerged to at least a thermocline depth in the waterbody, and so that the second end of the intake conduit is mounted to the catch boat in fluid communication with a first fluid reservoir in the catch boat, (b) towing a catch boat behind the trawler and concomitantly towing the trawl net behind the trawler, (c) urging, by the fluid urging means, fluid containing harvest species and by-catch along the intake conduit from the first end to the second end of the intake conduit so as to discharge fluid from the second end of the intake conduit into the first fluid reservoir, (d) discharging, by outflow means, outflow fluid and by-catch from the catch boat.

BRIEF DESCRIPTION OF THE DRAWINGS

FIG. 1, is a side elevation of the components of the harvesting and separating device.

FIG. 1a is an enlarged sectional view at the mouth of the trawl net taken on line 1 a—1a of FIG. 1.

FIG. 2 is an enlarged sectional view of the separating device.

FIG. 3 is an enlarged sectional view illustrating catch drawer in the lowered position.

FIG. 4 is an enlarged sectional view illustrating catch drawer in the elevated position.

FIG. 8 is a partially sectioned isometric view of a by-catch separating device.

DETAILED DESCRIPTION OF PREFERRED EMBODIMENTS

Figure 6:
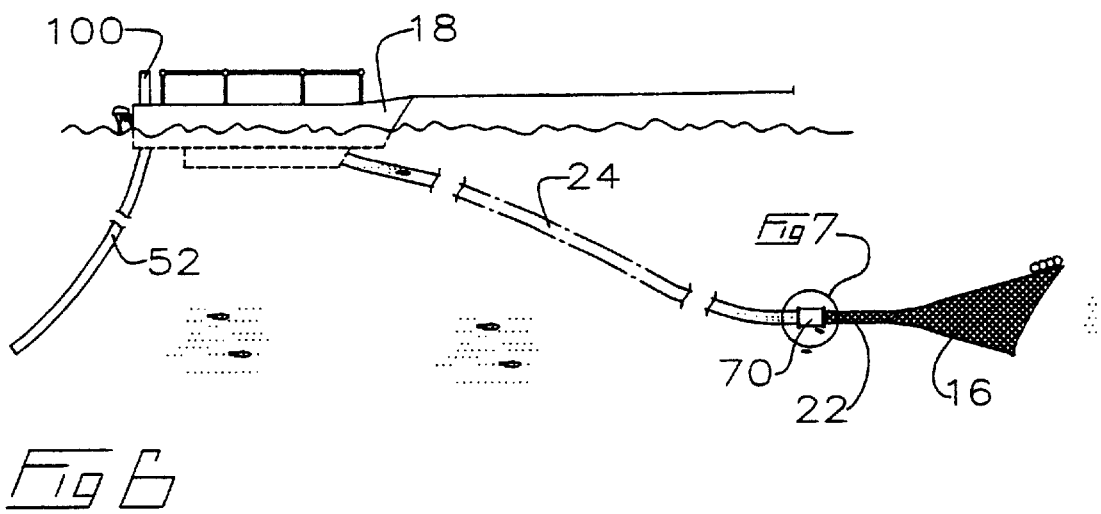
FIG. 6 is a side elevation of an alternative embodiment of the harvesting component with a by-catch separating device positioned downstream of the trawl net.
Figure 7:
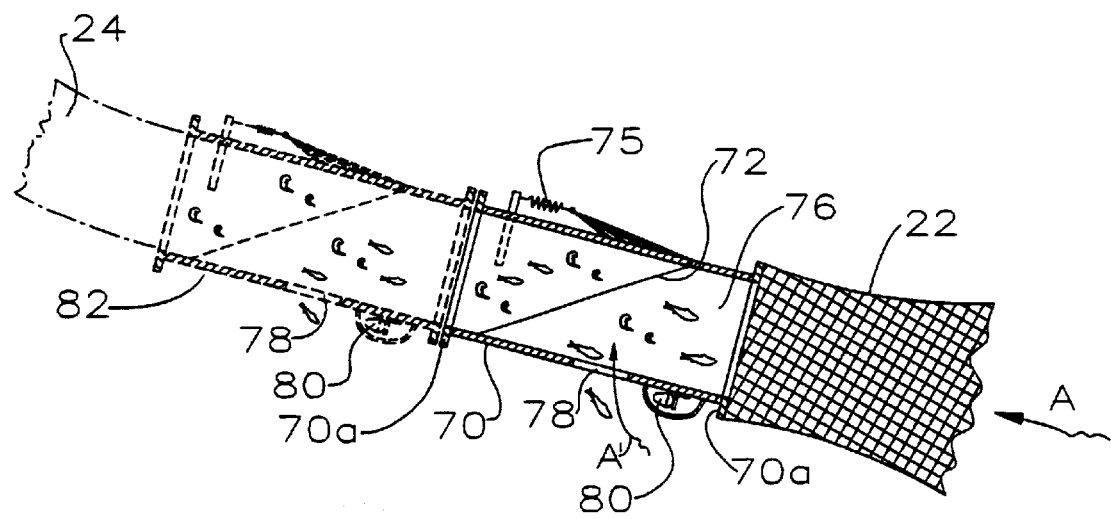
FIG. 7 is a detailed sectional view of a portion of FIG. 6.

As illustrated in FIG. 1, a trawler 10 has onboard cables 12 and 14 which are respectively secured to a trawl net 16 and a catch boat 18. In operation, trawler 10 tows trawl net 16 below the surface 19 of a waterbody. Net 16 is guided downwards within the waterbody, by known means, generally to a depth which coincides with the upper reaches of a stratified layer 20 of cooler water. Such stratification in bodies of fresh water occur as a result of solar warming. As trawl net 16 is towed below the surface 19 of the waterbody by trawler 10, target species as well as non-target or by-catch species enter the net's bell-shaped opening 16a and are forced rearwardly into the cod-end 22 of the net. In design, trawl net 16 generally has a weighted line 13 positioned around the bottom circumference of the opening while flotation means in the form of styrofoam balls 17 or the like effectively maintain the trawl net 16 in a fully open configuration during underwater operation.

A conduit 24 is mounted at one end, end 24a, to cod-end 22. Conduit 24 is mounted at end 24b, its opposite end, to the forward end of a catch drawer 26 mounted in catch boat 18. Conduit 24 provides for fluid communication between cod-end 22 and catch drawer 26.

With reference to FIGS. 2–4, catch boat 18 has an internal sluice 30 formed in the hull 32. Sluice 30 is surrounded by a perimeter wall 34, which prevents catch boat 18 filling with water and capsizing as it is drawn through the water. Catch drawer 26 is mounted within sluice 30 of catch boat 18 for vertical movement relative to perimeter wall 34. Such vertical movement may be accomplished by any mechanical or hydraulic means known in the art, for example by a drive gear 38 which is rotatably mounted to catch boat 18 and may be selectively rotated by a drive means. Drive gear 38 is meshed with a rack gear 40 which is rigidly vertically mounted to catch drawer 26. Rotation of gear 38 thus raises or lowers the catch drawer depending on the direction of rotation of the gear.

When catch drawer 26 is in the lowered position, the end 24b of conduit 24 is below surface 19 of the water body allowing conduit 24 to remain completely filled with water. Pump 50 maintains the surface level of the water in catch drawer 26 below the level of surface 19. This reduces the head pressure at opening 16a of net 16. Thus as trawl net 16 is towed below the surface 19 of the waterbody, the reduced head pressure at opening 16a of net 16 draws a constant flow in direction A of cold water and aquatic organisms from the cod-end 22 through conduit 24 and into catch drawer 26.

Catch drawer 26 contains a series of separator nets or screens 44 which are used to separate the target species from the by-catch species. Each screen 44 may have apertures of a different size. The screen having the largest apertures is positioned closest to end 24b of conduit 24. The screen having the smallest apertures is located at the opposite end 46 of catch drawer 26. This facilitates identifying, tagging and separating target from non-target species by an operator in catch boat 18.

End 46 of catch drawer 26 contains a pump 50 and a conduit 52 which extends from catch boat 18 to the operating depth of the trawl net 16 within stratified cold water layer 20.

As trawl net 16 and catch boat 18 are towed concomitantly through the waterbody, the constant upwelling of cool water from net 16 through conduit 24 delivers a supply of aquatic organisms to the catch drawer 26. As organisms of various sizes are confined behind the screen containing the appropriate sized apertures, the target species may readily be separated from the by-catch species and the target species removed to the deck of catch boat 18. The by-catch may then be deposited at the end 46 of catch drawer 26 where they can be readily transferred through conduit 52 in flow direction B to cool water at depth by the operation of pump 50. In operation, the flow rate of pump 50 advantageously should match the upwelling water flow rate from conduit 24.

Generally, pump 50 is only required to return by-catch organisms to cool water at depth during periods when there is a stratified temperature differential in the water body. This usually occurs normally during the summer months. At other times of the year, when there is little temperature differential between the water surface and the operating depth of the trawl net, the by-catch organisms may be returned directly to the surface of the water body.

Figure 5:
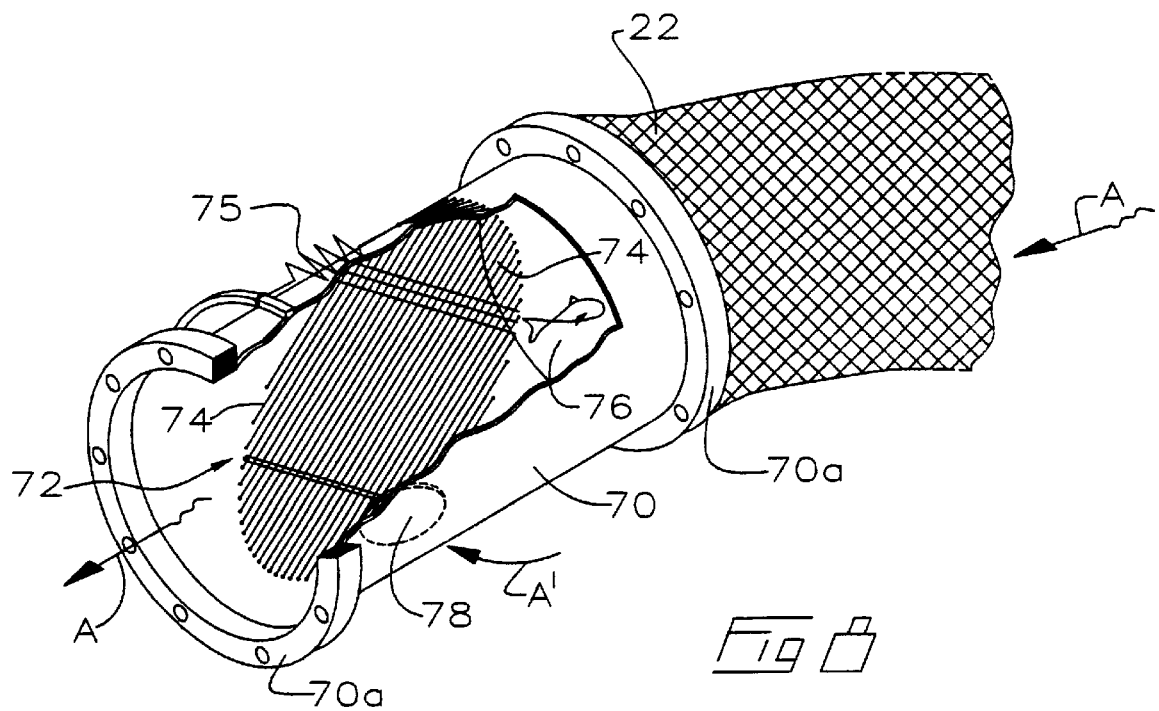
FIG. 5 is a sectional view illustrating an alternative embodiment of the catch drawer.
Figure 11:
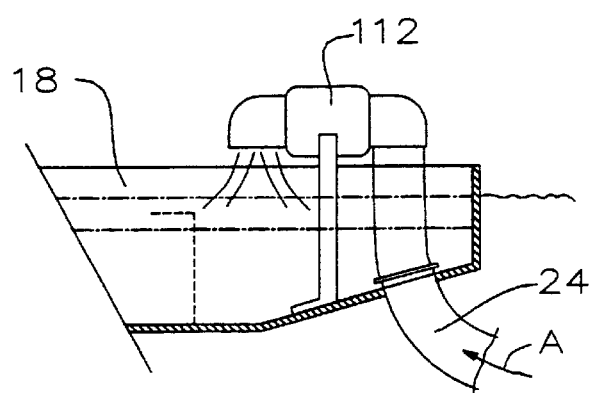
FIG. 11 is an alternative method of providing water flow from the net to the catch boat.
Figure 9:
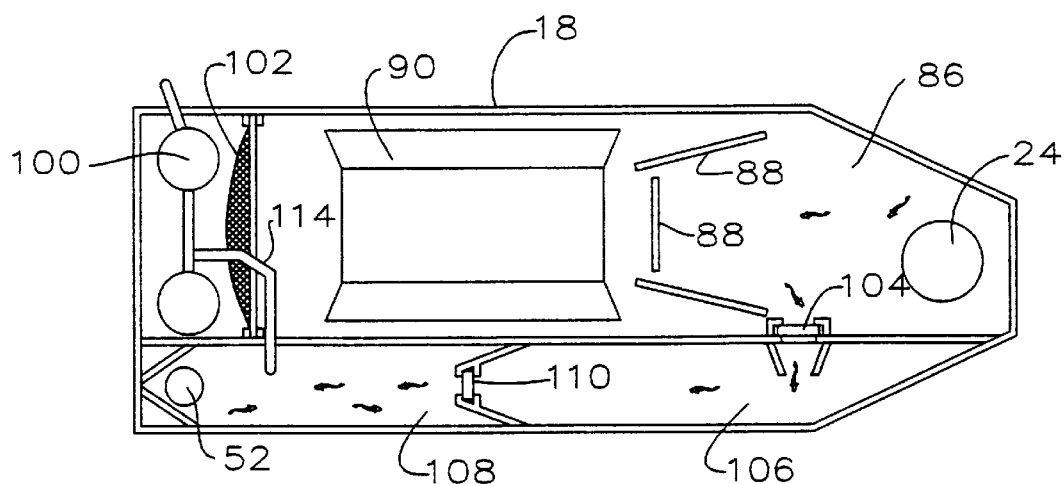
FIG. 9 is a plan view of the catch drawer.
Figure 10:
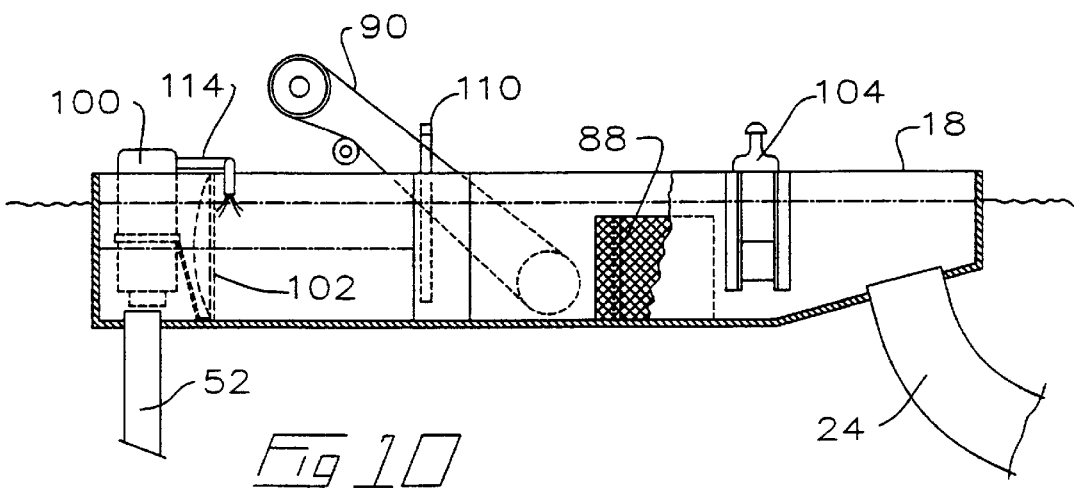
FIG. 10 is a partially sectioned side elevation of the catch drawer.

With reference to FIG. 5, it will be seen that the stern wall 54 of catch drawer 26 may be provided with an opening 56 which can be selectively opened or sealed by gate 58. As catch boat 18 is towed through the waterbody with the catch drawer 26 in the lowered position a low pressure area is created behind drawer 26. When gate 58 is in the raised position the low pressure cavity will tend to draw water outwards from the drawer. By-catch organisms will then be expelled directly to the surface of the waterbody, from end 46 of catch drawer 26, as the catch boat is drawn along the surface of the waterbody.

FIGS. 6–11 illustrate an alternative embodiment of the present invention in which a means of escapement for by-catch organisms during the transportation of by-catch and target species to the surface is provided. The means for escapement operates on the assumption that by-catch species, including juvenile by-catch species are significantly larger than the target species.

A by-catch separating tube 70 is connected downstream of the cod end 22 of trawl net 16, for example, positioned between cod end 22 and end 24a of conduit 24. Separating tube 70 is a short tubular section having end flanges 70a to permit attachment of net 16 and conduit 24 at opposite ends of the tubular section. An internal baffle 72 has a plurality of parallel, spaced apart members 74 which may be resilient or non-resilient flexible wires, strings, lines, filaments or the like. Baffle 72 is mounted within the tubular section by passing the ends of members 74 through a planar array of apertures spaced around opposite sides of the tubular section. Members 74 are biased against the pressure of the incoming water flow in direction A by tensioning means as external spring 75. Spring 75 pulls on the ends of members 74, for example, by means of a common line.

The flow of incoming water through separating tube 70 carries with it both harvestable target species and by-catch organisms. Where such by-catch are juvenile fish, they tend to maintain their stability by movement against the flow of water, that is, they are carried into separating tube 70 tail first.

Internal baffle 72 extends fully across separating tube 70 and is sloped relative to the water flow to create a wedge-shaped upstream chamber 76 within tube 70. Baffle 72 may be shaped at 45 degrees. Members 74 are spaced apart sufficiently so as to permit passage therethrough of all the target species. Non-target or by-catch species are unable to pass through baffle 72 unimpeded, and therefore contact members 74 tail first. As the by-catch species swim against the water flow and return to contact members 74, they are directed along the sloping baffle 72 toward one side of the separator tube 70. That side of tube 70 has an escape aperture 78. As net 16 and separating tube 70 are drawn through the water body, water is also drawn through escape aperture 78 in direction A'. This small flow of incoming water will result in movement of the by-catch fish toward aperture 78 due to their tendency to swim directly into the direction of water flow.

Normally, harvesting takes place at depth within the waterbody and usually occurs at night. A source of illumination 80 can be mounted externally of separating tube 70, in proximity to escape aperture 78, as an attractant to encourage by-catch to egress the downstream chamber 76 through aperture 78.

In the instance where the smaller of the non-target species approximates the size of the target species, as would happen after an initial separation by size in separation tube 70, a further reduction of by-catch is possible by placing a separating tube 82 downstream, for example adjacent, of tube 70. Members 74 of baffle 72 in tube 82, are spaced to accommodate the smaller size of the by-catch, that is, positioned closer together, to separate out the next smaller sized by-catch. This will still permit a quantity of smaller sized by-catch to be brought to catch boat 18 along with the target species. Alternatively, separation tube 70 may contain a plurality of such baffles 72 (not illustrated). The spaced apart members 74 of successive downstream baffle member 72 are positioned so as to permit passage only of successively smaller sized non-target species.

In an alternative embodiment of the present invention, both target and by-catch organisms enter catch boat 18 from conduit 24 into a receiving compartment 86. Compartment 86 contains several by-catch directing screens 88, a target species harvesting mechanism for example in the form of a conveyor 90 and water level regulating pumps 100 partitioned behind a target species impervious screen 102. Pumps 100 regulate the depth of water in receiving compartment 86, so that a continuous upwelling of water through conduit 24 occurs. Water level in receiving compartment 86 is generally kept below the level of the water body. Screens 88 direct by-catch away from conveyor 90 toward a normally closed gate 104. By-catch pass through gate 104, once open, into a holding compartment 106. Water level in compartment 106 is maintained at that of compartment 86. A discharge compartment 108 is accessible from holding compartment 106 through a normally closed gate 110. Compartment 108 is in direct fluid communication with the water body. Such by-catch as are directed to compartment 108 may re-enter the water body at depth through discharge conduit 52. The water level within compartment 108 is constantly replenished through an auxiliary discharge line 114 from pumps 100.

A live fish pump 112 may be mounted within catch boat 18 at the end of conduit 24. The use of such pumps is well known in the art for the safe and reliable transportation of live aquatic organisms. Fish pump 112 may be used to induce a more positive water flow from net 16 through conduit 24 into receiving compartment 86 of catch boat 18.

Efficiency of this harvesting method can be substantially enhanced by inducing a positive steady flow of fluid through intake conduit 24 to the catch boat 18 and several methods of achieving this positive liquid flow have been illustrated.

Figure 12:
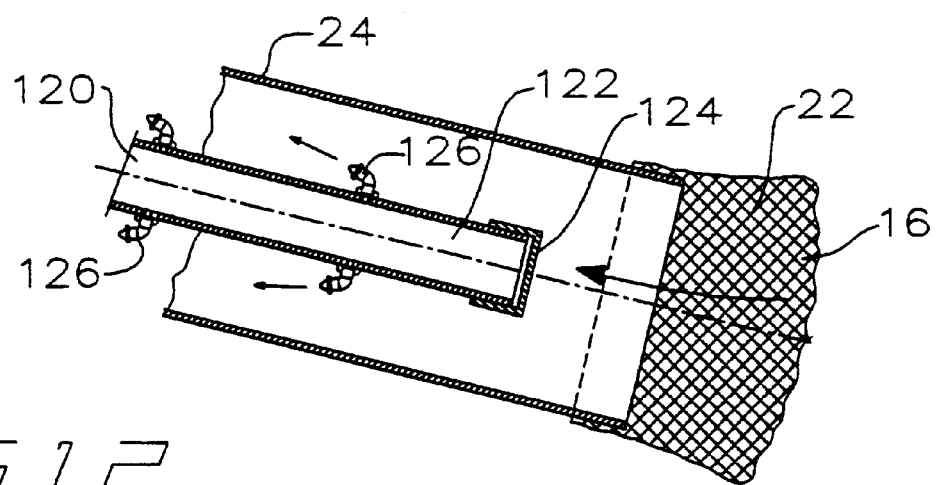
FIG. 12 is a sectional view of the intake conduit in proximity to the downstream end of the trawl net illustrating a further method for enhancing water flow from the net to the catch boat.

FIG. 12 illustrates one such method where a second conduit 120 is placed substantially coaxially within intake conduit 24. Conduit 120 is connected at a first end to a pump (not shown) on board catch boat 18 which urges fluid under pressure toward a second end 122 positioned in proximity to the downstream or cod end 22 of the trawl net 16. Conduit 120 has a plurality of downstream facing nozzles 126, that is, nozzles which face in the direction of the normal liquid flow through intake conduit 24. A second end 122 of intake conduit 24 is sealed by cap 124. As liquid is pumped through conduit 12, it is forced outwardly through nozzles 126 thereby slightly increasing the velocity of the liquid passing through intake conduit 24 which results in a slightly reduced pressure at the cod end 22 of net 16 which in turn encourages passage of both liquid and organism through conduit 24.

Figure 13:
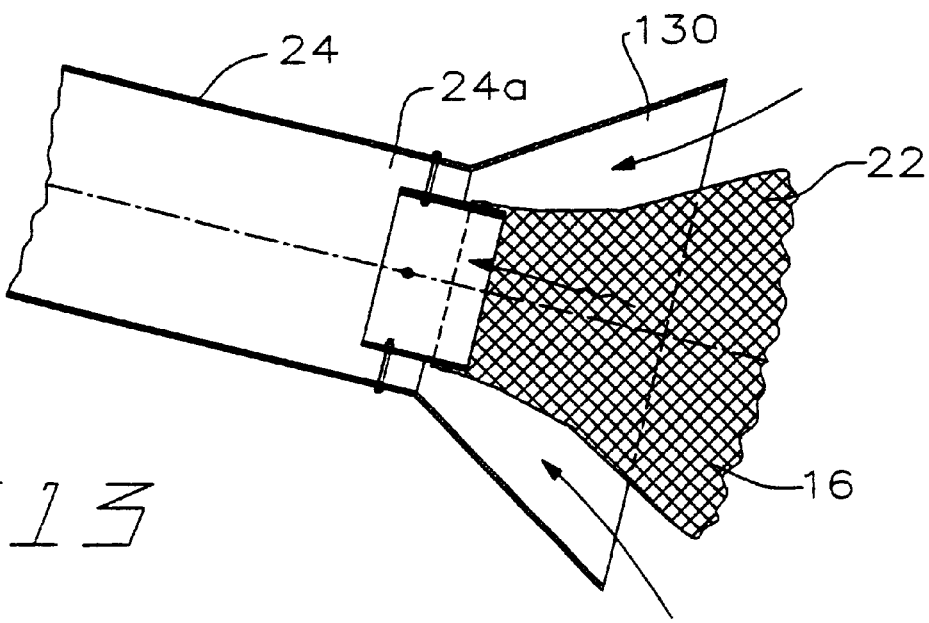
FIG. 13 is a sectional view of the intake conduit similar to FIG. 12, illustrating a further alternative method for enhancing water flow from the net to the catch boat.

In FIG. 13, the cod end 22 of net 16 is fastened inside intake conduit 24. A solid, annular flared collar 130 is secured to the first end 24a of the intake conduit 24 in proximity to the cod end 22 of trawl net 16. As the harvesting apparatus is drawn through the water body the flared collar 130 funnels liquid into intake conduit 24 for passage toward catch boat 18 to thereby assist in the transportation of target organisms through the intake conduit 24.

Figure 14:
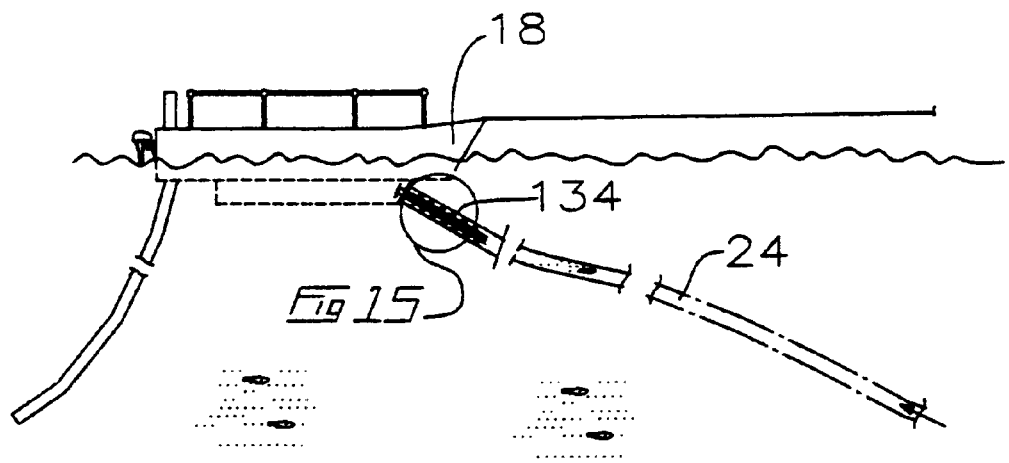
FIG. 14 is a side view of the catch boat where the second end of the intake conduit has positioned therein a further alternative method for enhancing water flow through the intake conduit.
Figure 15:
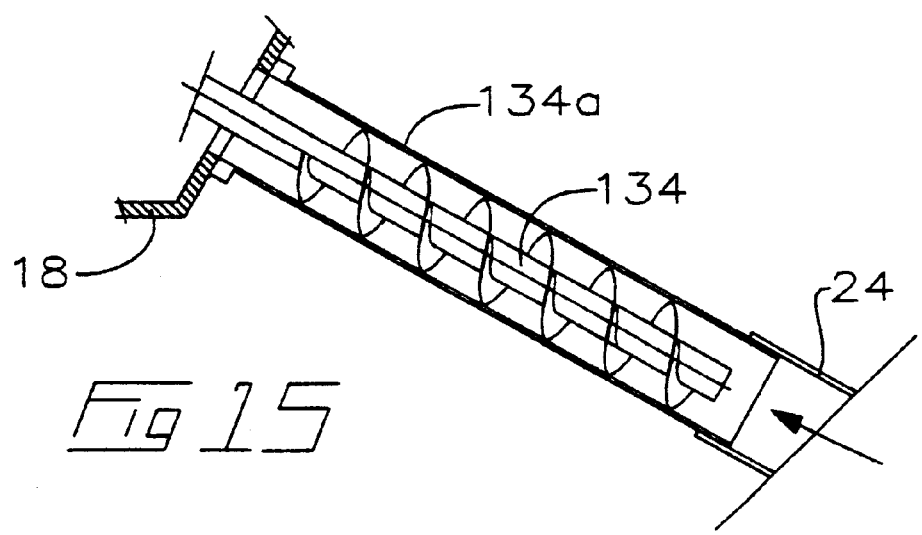
FIG. 15 is an enlarged sectional view of a portion of FIG. 14.

FIGS. 14 and 15 depict a further method to enhance a positive steady flow of fluid through intake conduit 24 to the catch boat 18. This method utilizes a screw 134 and housing 134a which is securely fastened to intake conduit 24 near catch boat 18. As screw 134 is slowly rotated by, for example, a suitable motor and belt drive (not illustrated) or other means known in the art, liquid and aquatic organisms are drawn through intake conduit 24 somewhat more efficiently than by the water pressure alone.

Figure 16:
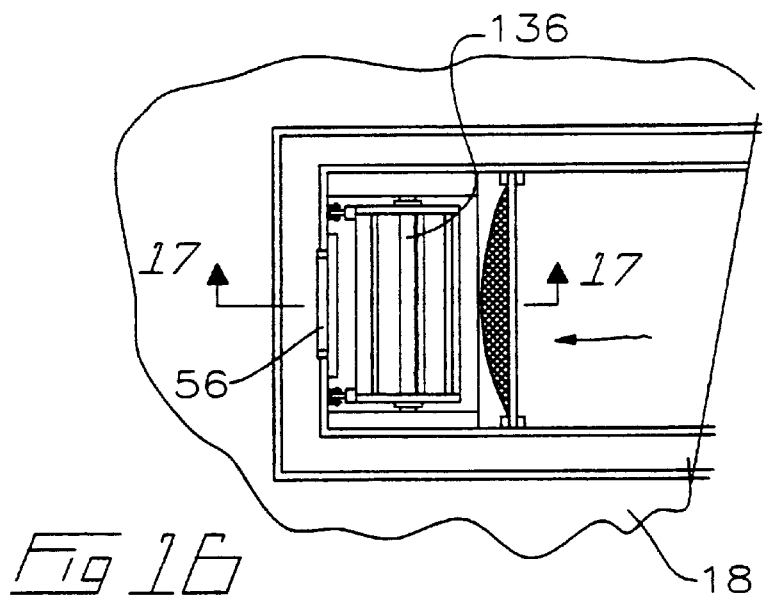
FIG. 16 is a plan view of a portion of the catch boat illustrating a further alternative method for enhancing water flow through the intake conduit.
Figure 17:
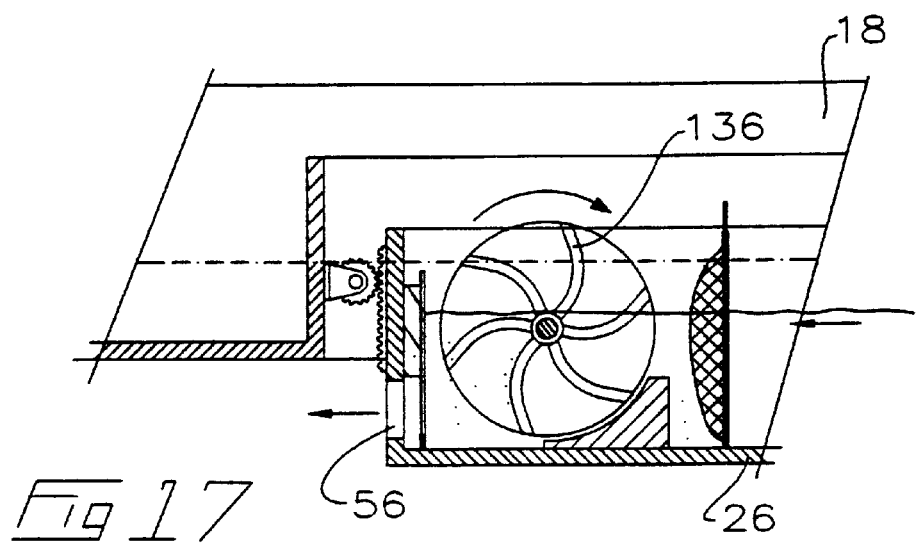
FIG. 17 is a sectional view on line 17—17 of FIG. 16.

FIGS. 16 and 17 illustrate a water wheel device 136 positioned within catch boat 18 in proximity to discharge opening 56. Constant rotation of water wheel 136 not only maintains a constant flow rate of liquid through the catch drawer 26 of catch boat 18, it also facilitates the removal of aquatic flora, zooplankton and detritus inadvertently harvested along with the intended targeted aquatic organisms.

Figure 18:
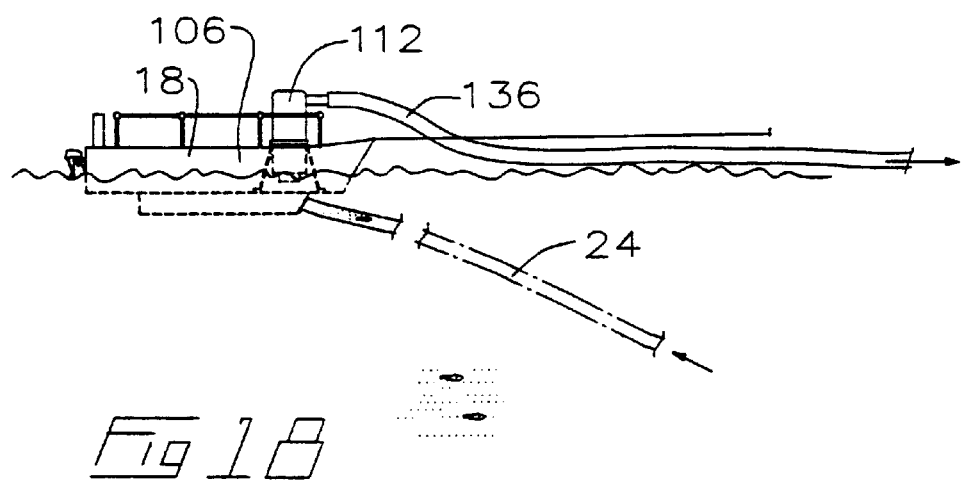
FIG. 18 is a side elevation of the catch boat illustrating a manner whereby target species may be conveyed directly to a vessel other than the catch boat.

In some instances it will be advantageous to convey the harvested target aquatic organisms directly from the catch boat to either the trawler vessel or to another nearby vessel for storage, processing or the like. In FIG. 18 one method is schematically illustrated where live fish pump 112, positioned within the holding compartment 106 of catch boat 18, is connected to the vessel of choice by an elongated conduit 136 for ready transfer of the harvested target species.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. For towing behind a trawler and mounting to a trawl net towable behind said trawler, an apparatus for separating target and non-target species harvested from a waterbody, comprising;

a catch boat towable behind said trawler for towing concomitantly with said trawl net, an elongate intake conduit having first and second ends, said first end of said intake conduit mountable to, so as to be in fluid communication with, an aperture in said trawl net, when said trawl net is submerged in said waterbody, said second end of said intake conduit opposite said first end of said intake conduit and mounted to said catch boat in fluid comniunication with a fluid reservoir in said catch boat, fluid urging means for urging fluid containing harvest species and by-catch along said intake conduit from said first end to said second end of said intake conduit so as to discharge fluid from said second end of said intake conduit into said fluid reservoir, and outflow means for discharging fluid and by-catch from said catch boat, wherein said fluid urging means is a selectively vertically displaceable catch drawer mounted within a well in said catch boat, and wherein said second end of said intake condiut is mounted to an intake aperture in said catch drawer positioned so as to be submergible below a waterline of said catch boat when said catch boat is floating in said waterbody and said catch drawer is lowered relative to said well, and wherein said fluid reservoir is contained within said catch drawer.

2. The apparatus of claim 1 wherein said intake aperture is adjacent a leading end of said catch boat.

3. The apparatus of claim 1 wherein at least one filter is mounted in said catch drawer and said outflow means is mounted within said catch drawer oppositely disposed from said intake aperture relative to said at least one filter.

4. The apparatus of claim 3 wherein said at least one filter is an array of filters spaced apart between said intake aperture and said outflow means, said array of filters having screening sizes which decrease from a first end of said array adjacent said intake aperture progressively to an opposite second end of said array.

5. The apparatus of claim 4 wherein said outflow means includes a fluid pump communicating with an elongate outflow conduit which may be extended to a thermocline depth in said waterbody.

6. The apparatus of claim 1 wherein said intake conduit includes a screening tube for screening out by-catch, said screening tube having an aperture in a wall thereof, a screen mounted in said screening tube and positioned across a conduit passageway of said screening tube and adjacent said aperture for urging by-catch out of said screening tube through said aperture in said wall.

7. The apparatus of claim 6 wherein said screen is a parallel array of uniformly spaced apart elongate flexible members.

8. The apparatus of claim 7 wherein said array of flexible members is mounted in said screening tube by journalling opposite ends of each member of said array of flexible members through corresponding holes in opposite walls of said screening tube.

9. The apparatus of claim 8 wherein at least one end of said each member of said array of flexible members is tensioned by a resilient tensioner.

10. The apparatus of claim 6 wherein said screen is mounted in said screening tube at an acute angle relative to said wall to thereby form a wedge-shaped upstream cavity in said screening tube between said screen and said wall, wherein said aperture in said wall is adjacent a vertex of said wedge-shaped cavity.

11. For towing behind a trawler and mounting to a trawl net towable behind said trawler, a method for separating target and non-target species harvested from a waterbody, comprising the steps of:

a) mounting, an elongate intake conduit between said trawl net and said catch boat, said intake conduit having first and second ends, said first end of said intake conduit mounted to, so as to be in fluid communication with, an aperture in said trawl net when said trawl net is submerged in said waterbody, said second end of said intake conduit opposite said first end of said intake conduit and mounted to said catch boat in fluid commnunication with a fluid reservoir in said catch boat, b) towing said catch boat behind said trawler, said trawler concomitantly towing said trawl net, c) urging, by fluid urging means, fluid containing harvest species and by-catch along said intake conduit from said first end to said second end of said intake conduit so as to discharge fluid from said second end of said intake conduit into said fluid reservoir, d) discharging, by outflow means, outflow fluid and by-catch from said catch boat, wherein said fluid urging means is a selectively vertically displaceable catch drawer mounted within a well in said catch boat, and wherein said second end of said intake conduit is mounted to an intake aperture in said catch drawer positioned so as to be submergible below a waterline of said catch boat when said catch boat is floating in said waterbody and said catch drawer is lowered relative to said well, and wherein said fluid reservoir is contained within said catch drawer, said method also comprising the step of lowering said catch drawer relative to said well.

\* \* \* \* \*